(12) United States Patent
Muscat

(10) Patent No.: US 7,091,303 B2
(45) Date of Patent: Aug. 15, 2006

(54) OIL SOLUBLE HYPERBRANCHED POLYESTERAMIDES

(75) Inventor: Dirk Muscat, Munich (DE)

(73) Assignee: DSM IP Assets B.V., Heerlen (NL)

(*) Notice: Subject to any disclaimer, the term of this patent is extended or adjusted under 35 U.S.C. 154(b) by 0 days.

(21) Appl. No.: 10/493,839

(22) PCT Filed: Oct. 28, 2002

(86) PCT No.: PCT/NL02/00684

§ 371 (c)(1),
(2), (4) Date: Nov. 29, 2004

(87) PCT Pub. No.: WO03/037959

PCT Pub. Date: May 8, 2003

(65) Prior Publication Data

US 2005/0080224 A1    Apr. 14, 2005

(30) Foreign Application Priority Data

Oct. 29, 2001    (EP) .................................. 01204104

(51) Int. Cl.
    *C08G 63/00* (2006.01)
(52) U.S. Cl. .................... 528/272; 252/70; 252/74; 252/77; 435/6; 528/271; 528/288; 528/310; 528/313; 528/315
(58) Field of Classification Search ................ 528/271, 528/272, 288, 310, 313, 315; 252/70, 74, 252/77; 435/6
See application file for complete search history.

(56) References Cited

U.S. PATENT DOCUMENTS 6,541,599 B1 * 4/2003 Wang .................... 528/310

FOREIGN PATENT DOCUMENTS

WO    00/56804    9/2000
WO    00/58388    10/2000

OTHER PUBLICATIONS

Van Benthem et al., New commerically available hyperbranched polymers—for tailor made solutions:, *Polymeric Materials Science and Engineering*, vol. 80, Mar. 21, 1999, pp. 72-73.

* cited by examiner

Primary Examiner—Terressa Boykin
(74) Attorney, Agent, or Firm—Mayer, Brown, Rowe & Maw LLP

(57) ABSTRACT

The invention relates to a method to produce a modified hyperbranched polyesteramide, containing at least two β-hydroxylamide ester groups and optionally also a hydroxyalkylamide endgroup, wherein (a) a hydroxy-, or aminefunctional monomer, oligomer or polymer is contacted with a first molar excess of a cyclic carboxylic acid anhydride, forming a mixture of an acid functional ester, respectively an acid functional amide and a cyclic carboxylic acid anhydride; (b) the mixture is contacted with an amount of alkanediolamine, wherein the amount is a second molar excess with respect to the first molar excess. The invention further relates to a modified hyperbranched polyesteramide containing at least two β-hydroxylamide ester groups and optionally also a hydroxyalkylamide endgroup with a degree of polymerisation of more than 19, as well as the use of these polyesteramides as rheology modifier in gas-oil or in diesel.

9 Claims, No Drawings

OIL SOLUBLE HYPERBRANCHED POLYESTERAMIDES

CROSS REFERENCE TO RELATED APPLICATION

This application is the National Phase of International Application PCT/NL02/00684 filed Oct. 28, 2002 which designated the U.S., and was published in English.

The invention relates to a method to produce a modified hyperbranched polyesteramide, containing at least two β-hydroxylamide ester groups and optionally also an hydroxyalkylamide endgroup.

The invention relates in particular to a method for the manufacturing of a modified hyperbranched polyesteramide according to formula (1):

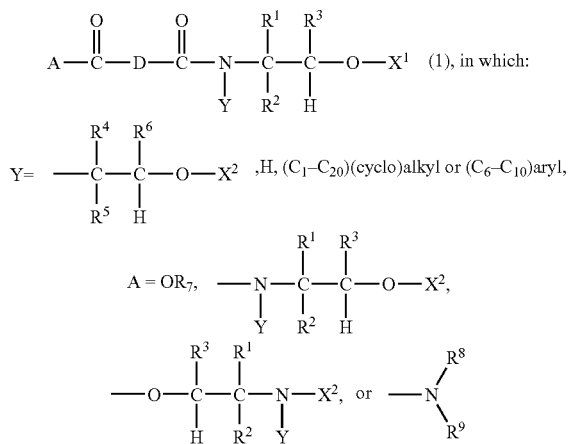

$D=(C_2–C_{24})$, aryl or (cyclo)alkyl aliphatic diradical, optionally substituted,

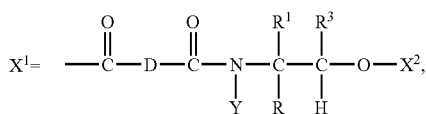

wherein
$X^2$ can be $X^1$, and terminates with at least —H,

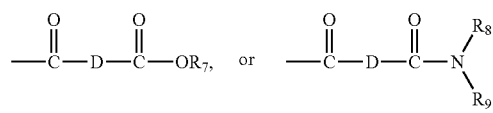

and optionally also

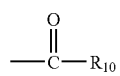

$R^1$, $R^2$, $R^3$, $R^4$, $R^5$ and $R^6$ may be H, $(C_6–C_{10})$ aryl or $(C_1–C_8)$(cyclo)alkyl radical, $OR_7$ is derived from a hydroxyfunctional monomer, oligomer or polymer, wherein $R_7$ can be aryl, alkyl, cycloalkyl, or the radical of polyethyleneoxide, polypropyleneoxide, poly tetrahydrofurane, or a nylon oligomer, $R_8$ and $R_9$ may, independently of one another, be chosen from the group of, optionally hetero atom substituted $(C_6–C_{10})$ arylgroups, or optionally heteroatom substituted $(C_1–C_{28})$ alkylgroups and $C(O)R_{10}$ is derived from a monomeric, oligomeric or polymeric monofunctional carboxylic acid.

Suitable carboxylic acids are, for example, saturated aliphatic $(C_1–C_{26})$ acids, unsaturated $(C_1–C_{20})$ fatty acids, aromatic acids and α,β-unsaturated acids.

Suitable saturated aliphatic acids are for example acetic acid, propionic acid, butyric acid, 2-ethyl hexanoic acid, laurylic acid and stearic acid.

Examples of suitable α,β-unsaturated acids are (meth)acrylic acid, crotonic acid and monoesters or monoamides of itaconic acid, maleic acid, 12-hydroxystearic acid, polyether carboxylic acid, and fumaric acid.

Suitable aromatic acid are for example benzoic acid and tertiairy butyl benzoic acid.

$R_{10}$ can be chosen from, for example, a saturated or unsaturated $(C_1–C_{40})$ alkyl or aromatic group, a polymer or an oligomer. Examples of suitable polymers are polyesters, polyethers and poly(capro)lactones.

$R_{10}$ can be substituted with for example ester groups, ether groups, amide groups and alcohol groups.

A method for the manufacturing of these hyperbranched polyesteramides is known from WO-A-00/58388. WO-A-00/58388 describes a method to produce the modified hyperbranched polyesteramide by reacting an alkanediolamine with a molar excess of a cyclic anhydride or diacid to form a hydroxyalkylamide at a temperature between 20° C. and 120° C., after which an acid terminated polyesteramide is obtained by polycondensation at a temperature between 120 and 250° C.

A modified hyperbranched polyesteramide is obtained by reacting the acid terminated polyesteramide with a monomer, oligomer or polymer containing reactive groups that can react with the carboxylic acid groups.

A disadvantage of this method is, that the modified polymers always contain a certain amount of di-acids or di-esters. The presence of these moieties has a negative effect in many applications of the modified hyperbranched polyesteramide. In high temperature oil applications for example these low molecular mass molecules easily evaporate, which frustrates the viscosity regulation of the oil.

The object of the invention is to provide a method to produce a modified hyperbranched polyesteramide without substantial amounts of di-acids or di-esters.

According to the invention, this object is achieved in that
(a) a hydroxy-, or aminefunctional monomer, oligomer or polymer is contacted with a first molar excess of a cyclic carboxylic acid anhydride, forming a mixture of an add functional ester, respectively an add functional amide and a cyclic carboxylic acid anhydride;
(b) the mixture is contacted with an amount of alkanediolamine, wherein the amount is a second molar excess with respect to the first molar excess.

With the method according to the invention no substantial amounts of di-acids or di-esters are present in the modified hyperbranched polyesteramide.

The temperature at which the hydroxy-, or aminefunctional monomer, oligomer or polymer is contacted with the cyclic carboxylic acid anhydride (step a.) is not critical but will be in general between room temperature and 80° C. Preferably the temperature will be about 60° C. Then the mixture is heated to a reaction temperature between 140° C. and 200° C. The addition of alkenediolamine in step b. in general is carried out at the reaction temperature of the reaction mixture in step a. In general the reaction between the acid anhydride and the alkanediolamine is fast, and is followed by the esterification reaction, which proceeds typically in 4–20 hours.

In the known method for the manufacturing of a modified hyperbranched polyesteramide the degree of polymerization depends on the ratio of alkanediolamine (hereinafter referred to as $B_3$) and cyclic anhydride or di-acid (hereinafter referred to as $A_2$). With less excess of the cyclic anhydride a higher degree of polymerization is obtained.

The disadvantage of the thus prepared hyperbranched polyesteramide is, that degree of polymerization is limited to 19. From an article by Dirk Muscat and Rolf A. T. M. van Benthem; "Hyperbranched Polyesteramides—New Dendritic Polymers, Topics" in Current Chemistry, Vol. 212, 2001, p. 42–80, it can be derived that it is impossible to make a modified hyperbranched polyesteramide with a degree of polymerization of more than 19 as this will result in gelation of the hyperbranched polyesteramide. Hereinafter the following definition of the functional groups will be used: A for a carboxylic goup and B for an hydroxide or a secondary amine group.

According to above-mentioned article, which is included herein by reference, scheme 1, p. 57, the system with an excess of $A_2$ and full conversion of the B groups, results in a mixture of 'hyperbranched' molecules (i.e. molecules containing at least one A–B bond) and unreacted $A_2$ monomers.

Starting with 2n+1 moles of $A_2$ and n moles of $B_3$, for n=1, the molar ratio in a reaction mixture of $A_2$ and $B_3$ for a reaction between a cyclic anhydride and a alkanediolamine is 3:1 and gelation will occur with the full conversion of the B groups. For values of n>1, gelation is predicted to occur before all B-groups have reacted, for n<1 gelation is not expected to occur.

For n=1, 2n+1=3 moles of $A_2$ and 1 mole of $B_3$ are present in the reaction mixture. At full conversion of the B-groups, neglecting the gelation and intramolecular reactions, there are 3 moles of A–B bonds. Each A–B bond implies that the number of molecules is reduced with 1, and therefore, (3+1)−3=1 moles of molecules are left. Since the reaction started with 3+1 moles, the average degree of polymerization (including the unreacted $A_2$) is equal to 4.

According to scheme 1 in the article, the fraction of unreacted $A_2$ equals $((n+2)/(4n+2))^2=0.25$. So, there are 0.25*3=0.75 moles of unreacted $A_2$ in the system, each having a degree of polymerization of 1. The amount of 'hyperbranched' molecules is therefore 1−0.75=0.25 moles, and are built from (3+1)−0.75=3.25 monomers. So, the average degree of polymerization is 3.25/0.25=13.

By an equivalent reasoning, one can deduce that the average number of unreacted A-groups in the hyperbranched molecules equals 6. So, when fully functionalized, the maximum degree of polymerization equals 13+6=19. Herein the degree of polymerization is applied to the 'hyperbranched' molecules only, neglecting unreacted $A_2$ molecules.

Preferably in the method of the invention the first molar excess is at least 50% and the second molar excess is at most 33.3%.

This results in modified hyperbranched polyesteramide with a degree of polymerization greater than 19.

The invention therefore also relates to modified hyperbranched polyesteramides according to formula 1 with a degree of polymerization greater than 19.

An advantage of the method according to the invention is that the degree of polymerization basically has no limitation.

The disadvantage of the hyperbranched polyesteramides described in WO-A-00/56804 is that they are generally insoluble or poorly soluble in oil, while branched polymers may improve the rheological properties of oil.

A further object of the invention therefore is to provide a hyperbranched polyesteramide that is soluble in oil. Under a hyperbranched polyesteramide that is highly soluble in oil in this description is understood a hyperbranched polyesteramide dissolvable in hexane, mineral oil, diesel and vegetable oil. Preferably the hyperbranched polyesteramide is dissolvable in hexane in an amount of at least 5% by weight at room temperature.

According to the invention, this object is achieved in that D is an optionally substituted diradical [C]—$C_s$, wherein [C] is the diradical, $C_s$ the substituted group and s being the number of C-atoms in the substituted group equals or is greater than zero, the hydroxy- or amine functional monomer, oligomer or polymer $HOC_t$, or $H_2NC_t$ has t C-atoms, with $t \geq 1$ and $T_1+T_2>4$, with $T_1=s$, $T_2=tkp_{COOH}/(2m+3q-p_{COOH}m)$, wherein k is the amount of molequivalents of $C_t$, m is the amount of molequivalents of D, and $p_{COOH}=\{(m+k-M.AC/56100)/(m+k)\}$, wherein M is the total mass (in g) of the hyperbranched polyesteramide and AC is the acid value in mg KOH/g resin.

In this formula the amount of starting materials are taken as k moles of $C_t$-(B*a)A* (monoacid), m moles of A-(ab)$B_2$ and q mole of $B_2$b, with $C_t$-(B*a)A* the reaction product of $HOC_t$, abbreviated as B-$C_t$ and a cyclic anhydride abbreviated as aA*, A-(ab)$B_2$ the reaction product of b$B_2$, an alkanediolamine and aA a cyclic anhydride.

D may be saturated or unsaturated. D may be substituted with for example a ($C_1$–$C_{26}$) alkyl group, which may be saturated or unsaturated;

D may be for example a (methyl-)1,2-ethylene [s=1], (methyl-)1,2-ethylidene [s=1], 1,3-propylene [s=0], (methyl-)1,2-cyclohexyl [s=5], (methyl-)1,2-phenylene [s=5], 2,3-norbornyl [s=7], 2,3-norbornen-5-yl [s=7] and/or (methyl-)1,2 cyclohex-4-enyl [s=(5)4] radical.

Depending on the starting monomers chosen, the variables D, $R^1$, $R^2$, $R^3$, $R^4$, $R^5$ and $R^6$ in the molecule or mixture of molecules can be selected to be the same or different.

The polymer composition according to the invention is generally a composition comprising higher and lower oligomers, which usually contains less than 50 wt. %, preferably less than 30 wt. %, of oligomers having a molecular weight smaller than 500 g/mol.

This causes the oil soluble hyperbranched polyesteramides to have a high boiling point, which favours the use of these materials in oil at high temperatures.

The advantage of the oil soluable hyperbranched polyesteramide of the invention is, that it contains no significant amount of monomeric esters. The presence of monomeric esters strongly disturbs the use of hyperbranched polyesteramides as a material to adjust the viscosity of oil.

The invention further related to the use of the hyperbranched polyesteramides according to the invention in gas-oil as rheology modifier or in diesel as anti freeze agent and to catch metals and soot.

An advantage of the use of the hyperbranched polyester amides of the invention as rheology modifier in oil is that no substantial amounts of di-acids or di-esters are present.

Hereinafter some Examples and Comparative Experiments will elucidate the invention without being limiting.

EXAMPLE I 422.9 g of mono-hydroxyl polyethylene oxide, a monodisperse oligomer with $M_n$=350 g/mol. is added to 292.4 g of hexahydrophthalic anhydride with a molar mass of 154.16 g/mol at room temperature whereafter the mixture is heated to 180° C. The mono-hydroxyl polyethylene oxide (1.21 mol) reacts at 180° C. during 0,5 hour with hexahydrophthalic anhydride (1.90 mol) yielding 1.21 mole of a mono-acid functional ester (with a molar mass of 350+154.16=404.16 g/mol, denoted by $C_f$-A) and 0.69 mole of hexahydrophthalic anhydride that has not reacted at the end of step (a).

In step (b), 114.8 g of diisopropanolamine (DIPA, with a molar mass of 133.19 g/mol, being 0.86 mol and denoted by $B_3$) is added to the reaction mixture of step (a.). First DIPA reacts with the unreacted hexahydrophthalic anhydride this being a fast reaction, yielding 0.69 mol of mono-acid-di-hydroxyl functional units (molar mass of these $AB_2$ units being 154.16+133.19=287.35 g/mole) and 0.17 mole of DIPA that has not reacted. Then esterification occurs in step b during 10 hours, wherein the $AB_2$ units react with itself thus forming a hyperbranched molecule and with the mono-acid functional ester formed in step a.

The acid number at the end of step (b) is 23.1 mg KOH/g resin, which is equivalent to a conversion $p_{COOH}$ of 0.85. This corresponds to a degree of polymerization of the obtained hyperbranched polyesteramide of 13.2. The degree of polymerization ($P_n$) is calculated in the following way. Denote the acid groups by A and the hydroxyl/amine groups by B. At the start of the esterification we have k=1.21 mole of mono-acid $C_f$-A, m=0.69 moles of $AB_2$ units and q=0.17 moles of $B_3$ units. At conversion $p_A$ a number of $(k+m)p_A$ ester bonds have been formed. Every bond decreases the number of molecules by one. So, $k+m+q-(k+m)p_A$ molecules are left at conversion $p_A$ (0.85). From these molecules, $(1-p_A)k$ molecules are mono-acid molecules that have not reacted. These are excluded in the computation of $P_n$, so we consider only $k+m+q-(k+m)p_A-(1-p_A)k$ molecules. These are built from $2k+2m+q-(1-p_A)k$ monomeric units, where the factor 2 for k and m comes from the fact that the mono-acid and the mono-acid-dihydroxyl units are reaction products and consist of two monomeric units. The ratio of the built-in monomeric units over the number of molecules gives $P_n$.

The mono-acid-di-hydroxy-functional units have 4 C-atoms 'outside' (originating from the hexahydrophthalic anhydride, so s=4 and T1=4. The mono-hydroxyl polyethylene oxide oligomer is considered to consist of 7.5 monomeric units with 2 C-atoms per monomer, so t=15 and T2=0.789×t=11.8. This material dissolves well in hexane.

EXAMPLE II 445.0 g of mono-hydroxyl polyethylene oxide. with $M_n$=550 g/mol (0.81 mol). Is added to 248.0 g of hexahydrophthalic anhydride (1.61 mol). The mono-hydroxyl polyethylene oxide reacts with the hexahydrophthalic anhydride yielding 0.81 mole of a mono-acid functional ester (molar mass is 550+154.16=604.16 g/mole) and 0.80 mole of anhydride that has not reacted at the end of step (a).

In step (b), 106.9 g of DIPA is dosed (molar mass is 133.19 g/mole), i.e., 0.803 mole. The DIPA preferably reacts with the available anhydride yielding 0.80 mole of mono-acid-di-hydroxyl functional units (molar mass of these units is 154.16+133.19=287.35 g/mole) and 0.003 mole of DIPA that has not reacted. Then esterification occurs ending up with an acid number at the end of step b of 13.5 mg KOH/g resin, which is equivalent to a conversion $p_{COOH}$ of 0.88. This corresponds to a degree of polymerization of the obtained hyperbranched polyesteramide of 31.7.

The mono-acid-di-hydroxy-functional units have 4 C-atoms 'outside' (originating from the hexahydrophthalic anhydride, so s=4 and T1=4.

The mono-hydroxyl polyethylene oxide oligomer is considered to consist of 12 monomeric units with 2 C-atoms per monomer, so t=24 and T2=0.779×t=18.7. This material dissolves well in hexane.

COMPARATIVE EXPERIMENT A

A double-walled glass reactor was charged with 100.0 g of molten diisopropanolamine [40° C.]. 362.1 g of adipic acid were added, the reaction mixture was heated 180° C. After three hours at this temperature the pressure was in the reactor was lowered to 2 mPA. After a total reaction time of 6.5 hours, the polymer was cooled and obtained as a viscous resin. The acid value was 365.3 mg KOH/g resin. 244.0 g of the above described resin were further reacted with 300.0 g dodecanol in a double-walled glas reactor. The reaction mixture was for 5.5 hours at 180° C., then the pressure was lowered to 2 mPa. After 10 hours reaction time the polymer was cooled and obtained as a viscous resin. The acid value was 10.8 mg KOH/g resin. This corresponds to a conversion $p_{COOH}$=0.965 and a degree of polymerization of 4.9. The rest amounts of not reacted di-acid is 0.25% (mole/mole) and the amount of diester equals 63% (mole/mole).

COMPARATIVE EXPERIMENT B

A double-walled glass reactor was charged with 114.8 g of molten diisopropanolamine [40° C]. 292.4 g of hexahydrophthalic anhydride were added, followed by 422.9 g of mono-hydroxyl poly(ethylene oxide) oligomers [Mn appr. 350]. The reaction mixture was heated 180° C. After ten minutes gelation occurs. This shows that the sequence of adding the different components is extremely important.

What is claimed is:

1. Method for the manufacturing of a modified hyperbranched polyesteramide according to formula (1):

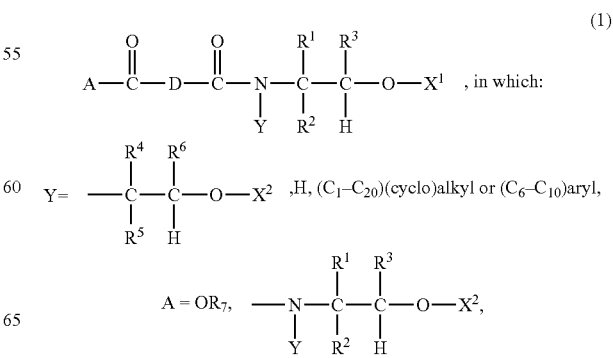

-continued

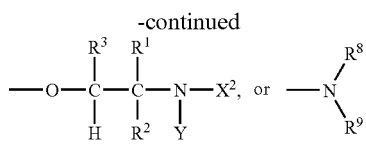

D=($C_2$–$C_{24}$), aryl or (cyclo)alkyl aliphatic diradical, optionally substituted,

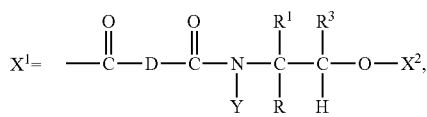

wherein
$X^2$ can be $X^1$, and terminates with at least —H,

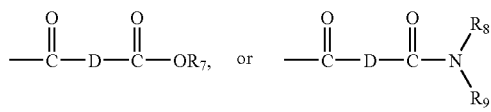

and optionally also

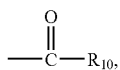

$R^1$, $R^2$, $R^3$, $R^4$, $R^5$ and $R^6$ may be H, ($C_6$–$C_{10}$) aryl or ($C_1$–$C_8$)(cyclo)alkyl radical, $OR_7$ is derived from a hydroxy-, or amino functional monomer, oligomer or polymer, wherein $R_7$ can be aryl, alkyl, cycloalkyl, or the radical of polyethyleneoxide, polypropyleneoxide, polytetrahydrofurane, or a nylon oligomer, $R_8$ and $R_9$ may, independently of one another, be chosen from the group of, optionally hetero atom substituted ($C_6$–$C_{10}$) arylgroups, or optionally heteroatom substituted ($C_1$–$C_{28}$) alkylgroups and C(O)$R_{10}$ is derived from a monomeric, oligomeric or polymeric monofunctional carboxylic acid, characterized in that (a) the hydroxy-, or amino functional monomer, oligomer or polymer is contacted with a first molar excess of a cyclic carboxylic acid anhydride, forming a mixture of an acid functional ester respectively an acid functional amide and a cyclic carboxylic add anhydride;

(b) the mixture is contacted with an amount of alkanediolamine, wherein the amount is a second molar excess with respect to the first molar excess.

2. Method according to claim 1, wherein the first molar excess is at least 50% and the second molar excess is at most 33.3%.

3. Modified hyperbranched polyesteramide according to formula 1 in claim 1, wherein the degree of polymerization is more than 19.

4. Modified hyperbranched polyesteramide according to claim 3, wherein D is an optionally substituted diradical [C]—$C_s$, wherein [C] is the diradical, $C_s$ the substituted group and s being the number of C-atoms in the substituted group equals or is greater than zero, the hydroxy- or amine functional monomer, oligomer or polymer HO$C_t$ or $H_2$N$C_t$ has t C-atoms, with t≧1 and $T_1$+$T_{2>4}$, with $T_1$=s, $T_2$=t.k$p_{COOH}$/(2m+3q–$p_{COOH}$m), wherein k is the amount of molequivalents of $C_t$, m is the amount of molequivalents of D, and $P_{COOH}$={(m+k–M.AC/56100)/(m+k)}, wherein M is the total mass (in g) of the hyperbranched polyesteramide and AC is the acid value in mg KOH/g resin.

5. Gas-oil composition comprising a rheology modifier, wherein the rheology modifier comprises a hyperbranched polyesteramide according to claim 3.

6. A method for modifying the rheology of a gas-oil composition comprising adding a hyperbranched polyesteramide according to claim 3 as a rheology modifier to the gas-oil composition.

7. Diesel composition comprising an antifreeze agent, wherein the antifreeze agent comprises a hyperbranched polyesteramide according to claim 3.

8. A method for reducing the freezing temperature of a diesel composition, comprising adding a hyperbranched polyesteramide according to claim 3, to the diesel composition.

9. A method of catching metals and soot comprising contacting the metals and soot with a hyperbranched polyesteramide according to claim 3.

* * * * *